April 15, 1952     R. D. ACTON     2,592,841
TRACTOR OPERATED DUMP RAKE
Filed Dec. 29, 1945     2 SHEETS—SHEET 1
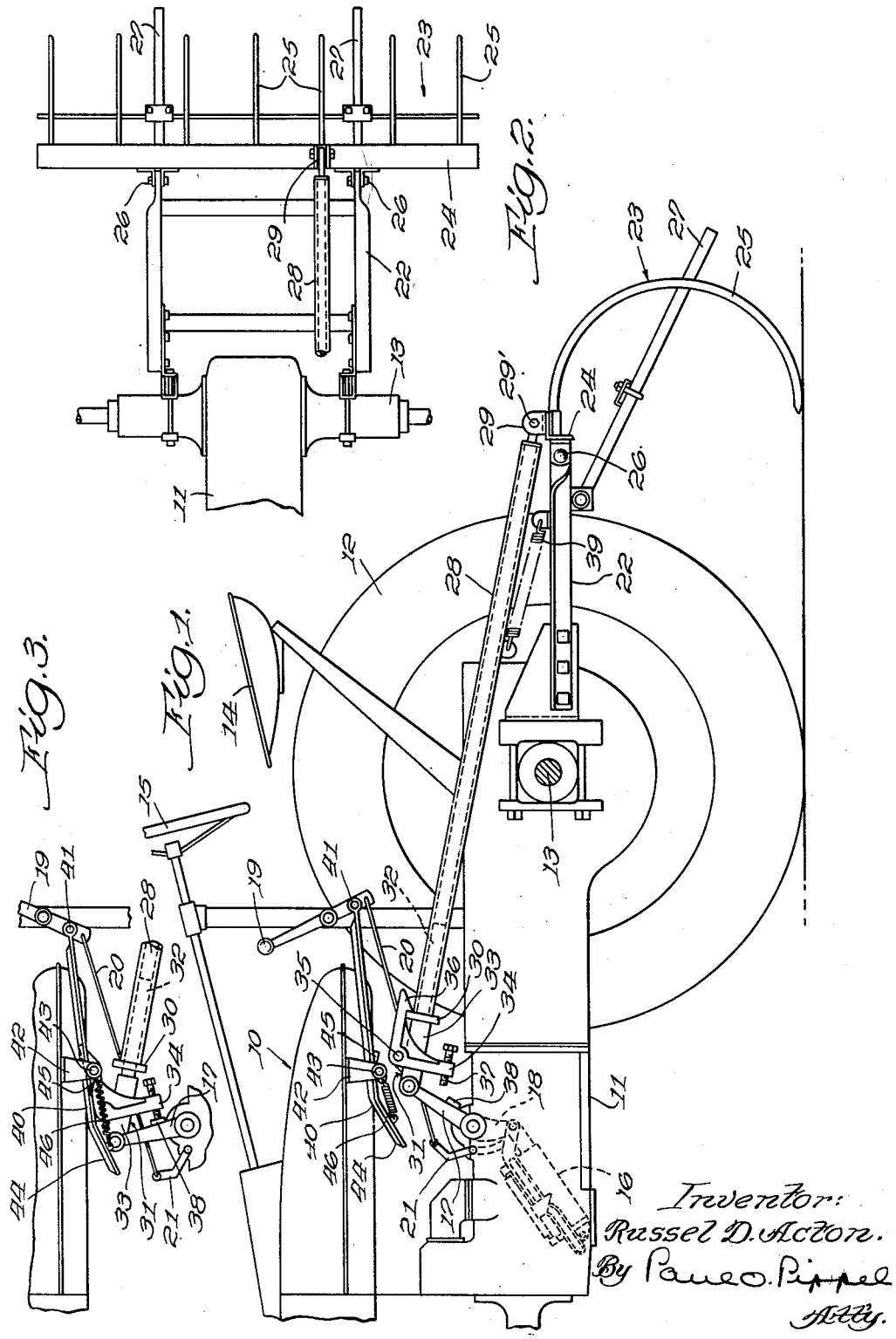
Inventor:
Russel D. Acton.
By Paul O. Pippel
Atty.

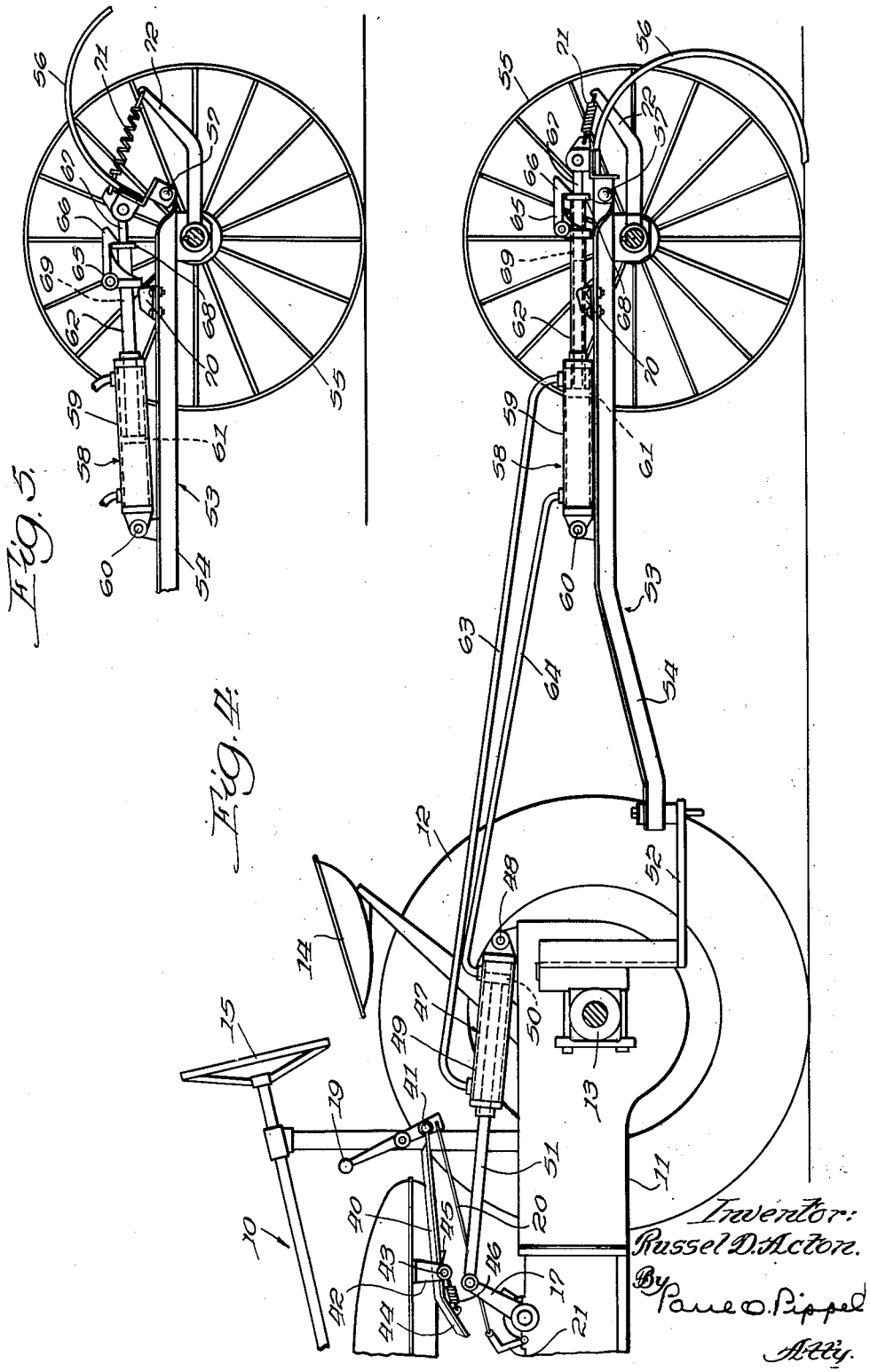

Patented Apr. 15, 1952

2,592,841

UNITED STATES PATENT OFFICE 2,592,841

TRACTOR OPERATED DUMP RAKE

Russel D. Acton, Chicago, Ill.

Application December 29, 1945, Serial No. 638,265

8 Claims. (Cl. 56—27)

This invention relates to an agricultural implement and more particularly to a tractor-operated dump rake. More specifically, it relates to an improved construction for lifting a tractor-mounted or tractor-drawn dump rake into a retracted or dump position and automatic means for returning it to its operating position.

An object of this invention is the provision of an improved construction for lifting or dumping a dump rake which is mounted on or drawn by a tractor.

Another object is the provision of a dump rake, the rake head of which is lifted or dumped by the actuation of a fluid pressure means associated with a tractor.

A further object is the provision of a dump rake mounted on a tractor, the dumping or lifting of said rake being accomplished by means of a fluid pressure device under manual control of an operator's station on the tractor.

Another object is the provision of a dump rake lifted by a power actuated device of a tractor which is under the manual control of an operator's station on the tractor, and release means for automatically returning the dump rake to an operating position after the rake head arrives at a predetermined dumped position.

Another object is the provision of a dump rake positioned to be drawn by a tractor, a fluid pressure means on the tractor cooperating with a fluid pressure means on the dump rake for lifting the dump rake out of operating position, and means for automatically returning the dump rake to an operating position after the dump rake has reached a predetermined dumped position.

These and other objects will become clear from the following detailed description when read in conjunction with the accompanying drawings, wherein:

Fig. 1 is a side elevational view of a tractor having a dump rake mounted thereon showing means for lifting said dump rake out of an operating position;

Fig. 2 is a plan view of a rear portion of a tractor showing a dump rake mounted on said tractor;

Fig. 3 is a fragmentary view of a tractor and associated parts for actuating and controlling the lifting and releasing of a dump rake;

Fig. 4 is a side elevational view of a tractor having a dump rake connected to the rear portion of the tractor, showing modified means for lifting said dump rake out of an operating position; and Fig. 5 is a side elevational view of a dump rake showing the dump rake in a lifted or dumped position just prior to the release of said dump rake back to an operating position.

Referring to the drawings, the numeral 10 designates a tractor having a longitudinal body structure 11 supported on rear ground wheels 12 journaled in a rear axle structure 13. An operator's station 14 is mounted on the longitudinal body structure 11 within close proximity to a steering mechanism 15.

Enclosed within the longitudinal body structure 11 is a fluid power actuating device 16 which is connected to a power lift arm 17 by means of a depending arm 18. A manual control lever 19 is pivotally mounted on a portion of the steering mechanism 15 and is connected to a push rod 20 which in turn is connected to a control arm 21. The control arm 21 is in turn connected to a valve arrangement (not shown) for controlling the power actuating device 16.

Connected to the rear axle structure 13 is a frame 22 at the rearward portion of which is mounted a rake head 23. A bar 24 extends transversely of the frame 22 and has connected thereto a plurality of vegetation gathering tines 25. The bar 24 is pivotally connected to the frame 22 by means of bearing pins 26. A pair of stripper bars 27 are connected to the frame 22.

A tubular lifting member 28 is pivotally connected to the transverse bar 24 by means of a bracket 29 and bolt 29'. The tubular lifting member 28 extends longitudinally forwardly of the rake head 23 and has at its end a collar portion 30. A connecting member or rod 31 is pivotally connected to the power lift arm 17 and includes a sliding portion 32 which fits into the tubular lifting member 28 for sliding engagement therewith. The connecting member or rod 31 further includes an enlarged portion 33 which is in abutment with the collar portion 30.

A release or latch member 34 having the shape of a bell crank is pivotally connected to the connecting member 31 by means of a pin 35. One leg of the release member is provided with a hook-portion 36 which engages the collar portion 30 and retains the lifting member 28 in engagement with the connecting member 31. The other leg of the release member 34 is provided with an adjusting nut 37 which is adapted to engage a stop 38 formed on the power lift arm 17. A resilient means such as a spring 39 is connected to the frame 22 and to the lifting member 28 for holding the rake head 23 in an operating position and also for returning said rake head when in a lifted position.

A slide bar 40 has one end pivotally connected to the manual control lever 19, as indicated at 41, and extends through a bracket 42 which is rigidly connected to a portion of the tractor 10. A pin 43 supports the slide bar 40 on the bracket 42. One end of the bracket 40 is provided with an angle surface 44 which is adapted to engage the power lift arm 17 upon movement of the power lift arm to a predetermined position. A projection 45 having a cam profile is formed on the slide bar 40 and is adapted to engage the pin 41 upon movement of the slide bar. A spring 46 is connected to the bracket 42 and to the angle portion 44 of the slide bar 40.

Referring particularly to Figs. 4 and 5, a modification of the invention is shown in which a fluid pressure means 47 is pivotally connected to the longitudinal body 11 as indicated at 48. The fluid pressure means 47 includes a cylinder 49 which contains for reciprocation therein a piston 50. A piston rod 51 is connected to the piston 50 at one end and at its other end pivotally to the power lift arm 17.

A draw-bar 52 is rigidly supported on the rear axle structure 13, and connected to this draw-bar 52 is a dump rake generally indicated by the numeral 53. The dump rake 53 includes a frame 54, the rearward portion of which is supported on ground wheels 55. A rake head 56 is pivotally mounted on the frame 54 by means of a bearing bolt 57. A fluid pressure means 58 including a cylinder 59 is pivotally connected to the frame 54 as indicated at 60. A piston 61 is mounted for reciprocation within the cylinder 59 and has connected thereto a piston rod 62. A fluid pressure transmitting means 63 and 64 is connected to the fluid pressure means 47 and 58, thus providing a closed fluid pressure circuit.

A release or latch means 65 is pivotally connected to the piston rod 62 and includes a hook portion 66. A lifting member or rod 67 is pivotally connected to the rake head 56. A shoulder portion 68 is provided on the lifting member or rod 67, said shoulder portion 68 being held in abutment with the piston rod 62 by means of the hook portion 66 on the release or latch means 65. The lifting member or rod 67 further includes a sliding portion 69 which is in telescoping engagement with the piston rod 62. A stop means 70 is provided on the frame 54. A spring 71 is connected to the rake head 56 at one end and at its other end to a bracket 72 which is rigidly connected to a portion of the frame 54.

In operation of the construction shown in Figure 1, the operator moves the manual control lever 19 rearwardly, causing the slide bar 40 and the push rod 20 to move forwardly. The projection 45 on the slide bar 40 engages the pin 43 and is held against said pin by means of the spring 46. The forward movement of the push rod 20 actuates the power actuating device 16 by means of valves (not shown). The valve construction is adequately described in the application of Carl W. Mott, Serial No. 527,625, filed March 22, 1944, now Patent 2,409,510, and entitled "Power Adjusting Mechanism."

Actuation of the power actuating device 16 causes the arm 17 to move in a counter-clockwise direction, moving the lifting arm 28 forwardly, thereby raising the rake head 23 out of operating position. Any vegetation that has been gathered by this rake head is thereupon dumped to the ground. The rake head 23 passes over the dumped vegetation and the power lift arm 17 continues its counter-clockwise movement until it engages the angle portion 44 of the slide bar 40. At this point the adjusting nut 37 comes into engagement with the stop 38, whereupon the release member 34 is pivoted and the hook portion 36 is disengaged from the collar portion 30. The lifting member 28 is now free to slide away from the power lift arm 17, and the rake head 23 urged by the spring 39 is returned to an operating position. At this point the slide bar 40 also is thereupon lifted upwardly and the projection 45 is lifted clear of the pin 43, whereupon the spring 46 causes the slide bar 40 to move rearwardly thereby actuating the manual control lever 19 to move in a counter-clockwise direction.

The movement of the manual control lever 19 into its former position causes the power actuating device 16 to move the power lift arm 17 in a clockwise direction and the latch and release member 34 will again engage the collar portion 30 to hold the lifting member 28 in engagement with the connecting member 31. Thus the cycle above described can be repeated when additional vegetation for dumping has been gathered.

Referring now to the modification shown in Figs. 4 and 5, the operation and control of the power actuating device 16 and manual control means therefor is similar to that above described. In this construction counter-clockwise movement of the power lift arm 17 actuates the piston 50 to move forwardly in the cylinder 49 of the fluid pressure means 47. The piston 61 in the cylinder 59 of the fluid pressure means 58 is moved by fluid pressure and reciprocates rearwardly, thus causing the rake head 56 to be pivoted about its bearing bolt 57 in a non-operating position. When the rake head 56 has reached a predetermined lifted position, as best shown in Fig. 5, the release or latch member 65 engages the stop 70, whereupon the latch member is rotated and the hook portion 66 is disengaged from the collar 68. The rake head 56 is thereupon free to return to its operating position and is urged into that position by means of springs 71.

The action of the power lift arm 17 upon the slide bar 40 and the manual control means 19 is the same as previously described. When the manual control means 19 has been moved to its extreme counter-clockwise position by the spring 46, the power lift arm 17 is again moved to its extreme clockwise position, whereupon the action of the fluid pressure means 49 and 58 will move the piston rod 62 rearwardly a sufficient distance to re-engage the latch member 65 and its hook portion 66 with the collar 68. Thus the cycle can again be repeated when a sufficient amount of vegetation has been gathered.

It should now be clear that an efficient and simple construction for lifting a dump rake has been shown and described. It is to be understood that additional modifications may be made therein without departing from the spirit of the invention or the scope thereof as defined in the appended claims.

What is claimed is:

1. For a tractor having a power actuating mechanism, a power lift arm operably connected to said power actuating mechanism, means for moving said power lift arm to a plurality of positions, in combination, a rake adapted to be pivotally connected to said tractor and adapted to be moved to and from an operating position, a pair of telescoping members connected to said rake and to said power lift arm, a release member associated with said telescoping members for locking said telescoping members against relative movement with respect to each other, and a stop means adapted to be associated with said tractor, said release member being positioned to engage said stop means upon movement of said rake to a predetermined lifted position, thereby actuating said release member to release said telescoping members for relative movement and lowering said rake to an operating position.

2. For a tractor having a power actuating mechanism, a power lift arm operably connected to said power actuating mechanism, a manual control means associated with said power actuating mechanism for moving said power lift arm to a plurality of positions, in combination, a rake adapted to be pivotally connected to said tractor, a connecting member connected to said power lift arm and to said rake for moving said rake to and from an operating position upon movement of said manual control means, a stop means adapted to be associated with said tractor, and a release member associated with said connecting member, said release member being operable to engage said stop and to release said rake to an operating position upon movement of said rake to a predetermined lifted position.

3. For a tractor having a power actuating mechanism, a power lift arm operably connected to said power actuating mechanism, means for moving said power lift arm to a plurality of positions, in combination, a rake adapted to be pivotally connected to said tractor, means for moving said rake to a lifted position comprising, a pair of telescoping members connected to said rake and to said power lift arm, latch means for locking said telescoping members against relative movement with respect to one another, and a stop means adapted to be associated with said tractor, said latch means being positioned to engage said stop means upon movement of said rake to a predetermined lifted position, thereby actuating said latch means to release said telescoping members for relative movement and lowering of said rake to an operating position.

4. A tractor-mounted dump rake comprising, in combination, a tractor having a power actuating device and control means therefor, a power lift arm connected to and actuated by said power actuating device, a rake head pivotally mounted on said tractor and adapted to be lifted to a non-operating position, a lifting member connected to said rake head, a connecting member connected to said power lift arm, said connecting member and said lifting member being connected in telescoping engagement, a latch means associated with said lifting member and said connecting member to retain said members in locked engagement with respect to one another, a stop means associated with said tractor, said stop means being positioned to engage said latch means for disengaging said lifting member from said connecting member upon lifting of said rake to a predetermined position, whereby said rake head will be returned to an operating position.

5. A tractor-mounted dump rake comprising, in combination, a tractor having a power actuating device and control means therefor, a power lift arm connected to and actuated by said power actuating device, a rake head pivotally mounted on said tractor and adapted to be lifted to a non-operating position, a lifting member connected to said rake head, a connecting member connected to said power lift arm, said connecting member and said lifting member being connected in telescoping engagement, a latch means associated with said lifting member and said connecting member to retain said members in locked engagement with respect to one another, a stop means associated with said tractor, said stop means being positioned to engage said latch means for disengaging said lifting member from said connecting member upon lifting of said rake to a predetermined position, and a resilient means for returning said rake head to an operating position.

6. A tractor-mounted dump rake comprising, in combination, a tractor having a fluid power actuating device and manual control means therefor, a power lift arm connected to and actuated by said power actuating device, a rake head pivotally mounted on said tractor and adapted to be lifted to a non-operating position, a longitudinally extending lifting member connected to said rake head, a longitudinally extending connecting member connected to said power lift arm, said connecting member and said lifting member being connected in telescoping engagement, a latch means associated with said lifting member and said connecting member to retain said members in locked engagement with respect to one another, and a stop means associated with said tractor, said stop means being positioned to engage said latch means for disengaging said lifting member from said connecting member upon lifting of said rake to a predetermined position, whereby said rake head will be returned to an operating position.

7. A tractor-mounted dump rake comprising, in combination, a tractor having a fluid power actuated device and control means therefor, a power lift arm actuated by said power actuating device movable by said control means to a plurality of positions, a rake head pivotally associated with said tractor and adapted to be lifted into a non-operating position, a lifting member pivotally connected to said rake head, a connecting member operatively connected to said power lift arm, said connecting member and said lifting member being connected in telescoping engagement, a latch means operatively connected to said power lift arm for retaining said lifting and connecting members in locked engagement with one another, a stop means associated with said tractor, said stop means being positioned to engage said latch means for disengaging said lifting member from operative connection with said power lift arm upon lifting of said rake head to a predetermined position, means for returning said rake to an operating position, and means connected to the control means and actuated by said power lift arm to move said power lift arm for re-engaging said latch means and said lifting and connecting members in locked engagement when said rake head is in the operating position.

8. A tractor-mounted dump rake comprising, in combination, a fluid power actuated device adapted to be mounted on a tractor and control means therefor, a power lift arm actuated by said power actuating device and movable by said control means to a plurality of positions, a rake head adapted to be pivotally mounted on said tractor and adapted to be lifted to a non-operating position, a lifting member connected to said rake head, a latch means operatively connecting said lifting member to said power lift arm, a stop means adapted to be associated with said tractor, said stop means being positioned to engage said latch means for disengaging said lifting member from operative connection with said power lift arm upon lifting of said rake head to a predetermined height, and means for returning said rake head to an operating position.

RUSSEL D. ACTON.

REFERENCES CITED

The following references are of record in the file of this patent:

UNITED STATES PATENTS

| Number | Name | Date |
|---|---|---|
| 2,222,840 | Holmes | Nov. 26, 1940 |
| 2,237,280 | Coultas et al. | Apr. 1, 1941 |
| 2,300,164 | Musselman | Oct. 27, 1942 |
| 2,319,458 | Hornish | May 18, 1943 |
| 2,366,234 | Blaydes | Jan. 2, 1945 |
| 2,402,449 | Rockwell | June 18, 1946 |
| 2,409,510 | Mott | Oct. 15, 1946 |
| 2,410,918 | Acton | Nov. 12, 1946 |
| 2,427,871 | Mott | Sept. 23, 1947 |